UNITED STATES PATENT OFFICE 2,058,220

PROCESS FOR VITAMINIZING FOODS AND PRODUCT THEREOF

Franz Elger, Basel, Switzerland, assignor to Hoffmann-La Roche Inc., Nutley, N. J., a corporation of New Jersey No Drawing. Application March 29, 1935, Serial No. 13,788. In Switzerland April 18, 1934

4 Claims. (Cl. 99—11)

The antiscorbutic vitamin (vitamin C, laevo-ascorbic acid) contained in foods of vegetable or animal origin is very sensitive and is almost completely destroyed with the ageing and drying of these foods or in the canning process. If foods, for instance fruit juices, milk, to which vitamin C has been added, are canned or dried, that is to say converted in forms which can be stored, there will likewise be a loss of vitamin.

It has now been found, that by the addition of esters of 2-keto-laevo-gulonic acid the same properties may be obtained in foods, as by the addition of laevo-ascorbic acid. Unlike the foods with an admixture of laevo-ascorbic acid, those containing an ester of 2-keto-laevo-gulonic acid can be stored for a considerable length of time without losing their vitamin action. They may likewise be dried or canned without notable loss of vitamin action. The esters of 2-keto-laevo-gulonic acid are transformed into laevo-ascorbic acid by reaction with acids and alkali. It is to be supposed that the same transformation takes place in the organism; thus the esters of 2-keto-laevo-gulonic acid may be taken to be provitamin C, the same as carotene is provitamin A and ergosterine provitamin D.

Example 1

In one liter of milk 0.5 grams of 2-keto-laevo-gulonic-acid-methyl-ester are dissolved. In tne guinea-pig test this milk shows the same antiscorbutic action as milk to which 0.1 gram of laevo-ascorbic acid has been added. Whereas, however, the latter quickly loses its antiscorbutic action on being left to stand, the milk with the admixture of the ester of 2-keto-laevo-gulonic acid shows no loss of activity.

Example 2

To one kilogram of tomato marrow 1 gram of 2-keto-laevo-gulonic-acid-ethyl-ester is added. After sterilization in soldered tins the preserved vegetable retains its good vitamin C action.

I claim:
1. The process for maintaining in foods their vitamin C effect, which consists in adding an ester of 2-keto-laevo-gulonic acid to the foods.
2. The process for maintaining in foods their vitamin C effect, which consists in adding 2-keto-laevo-gulonic-acid-methyl-ester to the foods.
3. A food normally containing vitamin C and having added thereto an ester of 2-keto-laevo-gulonic acid.
4. A food normally containing vitamin C and having added thereto 2-keto-laevo-gulonic-acid methyl-ester.

FRANZ ELGER.